UNITED STATES PATENT OFFICE.

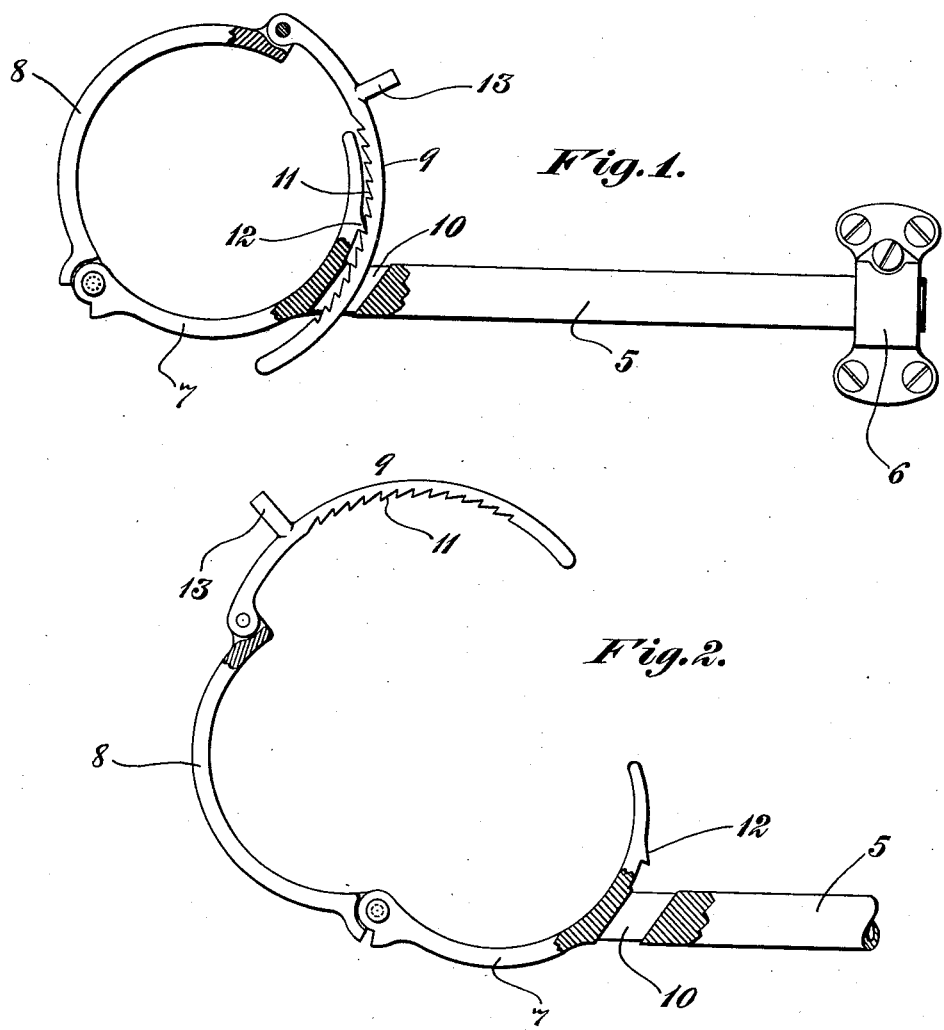

PATRICK MORRISSEY, OF EASTHAMPTON, CONNECTICUT, ASSIGNOR TO THOMAS A. COTTER, OF WILLIMANTIC, CONNECTICUT.

SPARE-TIRE HOLDER.

1,085,873.  Specification of Letters Patent.  Patented Feb. 3, 1914.

Application filed November 26, 1912. Serial No. 733,696.

*To all whom it may concern:*

Be it known that I, PATRICK MORRISSEY, a citizen of the United States, residing at Easthampton, in the county of Middlesex and State of Connecticut, have invented certain new and useful Improvements in Spare-Tire Holders, of which the following is a specification.

This invention relates to spare tire holders or "tire irons" as they are also known and which are employed for carrying the spare tire generally constituting part of the equipment of an automobile, the object of the invention being to provide an article of this character which is simple in construction and which has means for securely yet removably holding a spare tire in place without the necessity of a leather strap, the construction being such that the tire can be readily removed and mounted in place. There are spare tire holders which involve means for embracing the tire at one or more points, and the tire embracing means ordinarily includes a leather strap. Considerable time and trouble are required to undo this strap to free the tire, and an equal amount of time and trouble are requisite to buckle up the strap to hold the tire in place; I dispense with this leather strap and its many objections.

In the drawings accompanying and forming part of the present specification I have shown in detail one of the several convenient forms of embodiment of the invention, which to enable those skilled in the art to practise the same will be set forth fully in the following description, while the novelty of the invention will be included in the claims succeeding said description. From this it will be clear that I do not restrict myself to such showing; I may depart therefrom in several respects within the scope of the invention embraced by said claims.

Referring to said drawings: Figure 1 is a side elevation partly broken away and in section, of a spare tire holder involving my invention and with the loop closed. Fig. 2 is a similar view of the outer portion of the article with the loop open.

Like characters refer to like parts in both figures of the drawing.

A spare tire holder involving my invention preferably but not necessarily, includes in its make-up a suitable supporting body which as shown consists of an elongated shank 5. This shank may be of any suitable length or form in cross section; it is represented as cylindrical and as fitting a similarly shaped opening in the socket member 6 adapted to be attached by screws or otherwise to some convenient portion of an automobile. The tire holders are generally arranged in pairs, although this is not a matter of consequence. The shank 5 and socket member 6 are common in this art, for which reason it is not necessary for me to further describe the same.

The shank 5 is shown provided at its outer end with an arm as 7 preferably but not necessarily, of bowed form which is adapted to partially surround or straddle the spare tire. The shank 5 is united with said arm 7 between the ends of the latter. Pivoted or otherwise suitably connected to the forward end of the arm 7, is a tongue 8, which two parts constitute a tire-receiving fork. Between the free end of said tongue and the adjacent end of the arm 7 is arranged preferably a latch member which may be of any suitable kind, although it is preferably rigid and metal; that denoted in a general way by 9 answers satisfactorily my purposes, said latch member being shown as pivoted to the outer end of the tongue 8. The arm 7, tongue 8 and latch member 9 jointly present a loop or annulus for receiving the tire, and when in tire-holding relation they present a practically continuous structure as shown in Fig. 1, to thereby securely hold the tire in place. By manipulating the latch 9 as will hereinafter appear it and the tongue 8 can be swung outward as shown in Fig. 2 and consequently release the tire.

The shank 5 at or near its outer end and preferably where it joins with the arm 7, has a guide slot or opening 10 for the passage of the free portion of the latch member 9. The latch member 9 is shown as being of segmental form and as having upon its inner surface teeth 11 coöperative with a fixed catch as 12 on the adjacent surface of the arm 7. In Fig. 1 the catch or detent 12 is shown as engaging one of the teeth 11 of the serrated portion of the latch member 9 to thereby hold said latch member against movement and thus maintain the annular form of the tire-embracing portion of the holder. By moving the latch member 9 rearward sufficiently to disengage it from the catch 11, said latch member and hence the tongue 8 will be freed and can be swung outward as shown in Fig. 1 to open the tire-receiving fork, so that the spare tire can be slipped from place. The slot or opening 10 properly guides the latch member 9 and limits side motion thereof.

It will be seen that the latch member 9 is pivoted to the tongue 8 in such way that the spare tire cannot come against said latch member as in case it did, the latch member might be accidentally opened, and this result I secure in the present case by locating the pivot between said tongue and latch member outside the inner face of said tongue 8. To facilitate the manipulation of the latch member 9 the same may be equipped with a finger piece 13.

What I claim is:

1. A spare tire holder comprising a shank, a bowed arm united between its ends to said shank, a tongue movably connected to said bowed arm, and a latch member movably connected to the tongue, said arm, tongue and latch member constituting when in operative relation a substantially annular structure, said arm having a fixed catch and said latch member being serrated to coöperate with said catch.

2. A spare tire holder comprising a shank, a bowed arm united between its ends to said shank, a tongue pivoted at one end to said bowed arm, a latch member pivoted to the other end of the tongue, said arm, tongue and latch member constituting collectively when in operative position a substantially annular structure, said arm having a fixed catch and said latch member being serrated to coöperate with said catch.

3. A spare tire holder comprising a shank, a bowed arm united between its ends to said shank, a bowed tongue pivoted to said arm, a bowed latch member pivoted to the tongue, said bowed latch member being serrated on its inner surface, the arm having a tooth to coöperate with the serrations of said latch member, and the shank having a slot for the passage of said tongue.

4. A spare tire holder comprising a shank, a bowed arm united between its ends to said shank, a bowed tongue pivoted to said arm, and a bowed latch member pivoted to the tongue outside the inner face of said tongue, said bowed latch member being serrated on its inner face, the arm having a tooth to coöperate with the serrations of the latch member to hold the latter closed.

5. A spare tire holder comprising a bowed arm, a bowed tongue pivoted to said arm, and a bowed latch member pivoted to the tongue outside the inner face of said tongue, said bowed latch member being serrated on its inner face, the arm having a tooth to coöperate with the serrations of the latch member to hold the latter closed.

In testimony whereof I affix my signature in presence of two witnesses.

PATRICK MORRISSEY.

Witnesses:
EARL S. BARTON,
JAMES O'CONNELL.

---

Copies of this patent may be obtained for five cents each, by addressing the "Commissioner of Patents, Washington, D. C."